US007624016B2

(12) United States Patent
Ju et al.

(10) Patent No.: US 7,624,016 B2
(45) Date of Patent: Nov. 24, 2009

(54) METHOD AND APPARATUS FOR ROBUSTLY LOCATING USER BARGE-INS IN VOICE-ACTIVATED COMMAND SYSTEMS

(75) Inventors: Yun-Cheng Ju, Bellevue, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 10/897,800

(22) Filed: Jul. 23, 2004

(65) Prior Publication Data

US 2006/0020471 A1    Jan. 26, 2006

(51) Int. Cl.
    *G10L 21/00* (2006.01)
(52) U.S. Cl. ........................ 704/270; 704/275
(58) Field of Classification Search ............ 704/270, 704/275, 251; 379/88.01; 715/534
    See application file for complete search history.

(56) References Cited

U.S. PATENT DOCUMENTS

| | | | | |
|---|---|---|---|---|
| 6,269,336 | B1 * | 7/2001 | Ladd et al. | 704/270 |
| 6,282,511 | B1 * | 8/2001 | Mayer | 704/270 |
| 6,405,170 | B1 * | 6/2002 | Phillips et al. | 704/270 |
| 6,941,268 | B2 * | 9/2005 | Porter et al. | 704/270 |
| 7,158,936 | B2 * | 1/2007 | Denenberg et al. | 704/270.1 |
| 7,246,062 | B2 * | 7/2007 | Knott et al. | 704/246 |
| 7,260,187 | B1 * | 8/2007 | McAllister | 379/88.04 |
| 2003/0103608 | A1 * | 6/2003 | Pearson et al. | 379/88.18 |

OTHER PUBLICATIONS

Kaspar et al. "Barge-in Revised". In Proc. Eurospeech '97, Rhodes, Greece, 1997, pp. 1-4.*
Gina-Anne Levow, "Making Sense of Silence in Speech User Interfaces", CHI '97 Workshop: Speech User Interface Design Challenges (1997).
Nitin Sawhney, "Nomadic Radio: Speech and Audio Interaction for Contextual Messaging in Nomadic Environments", ACM Transactions on Computer-Human Interaction, vol. 7, No. 3, Sep. 2000, pp. 353-383.
"FUJITSU Call Center System CCRM-1 Product Description" FUJITSU Call Center System CCRM-1—Product Description, FUJITSU, Sep. 2002.
Keith Byerly, "Echo Cancellation for AST Applications", Brooktrout Technology, Apr. 2002.

* cited by examiner

*Primary Examiner*—James S Wozniak
(74) *Attorney, Agent, or Firm*—Westman, Champlin & Kelly, P.A.

(57) ABSTRACT

A method of querying a user to select from a list in a voice-activated command system is provided. The method includes generating command prompt phrases during which the user can select items on the list. The command prompt phrases include an item on the list and an index for another item on the list. In some embodiments, each command prompt phrase also includes a period of silence between item on the list and the index for another item on the list. If a user selecting barge-in is received during a particular command prompt phrase, the corresponding item on the list is selected.

18 Claims, 4 Drawing Sheets

0) Give introduction prompt, set command='Silence'; index = 0;

1) If (command == 'StartOver') set index = 1;

2) If (index >= listSize) exit // not in the list

3) If (command == 'Silence') set bRepeatPosition = false;
   Otherwise set bRepeatPosition = true;

4) If (command == 'Next' or command == 'Silence')
   set index = index + 1;

5) If (bRepeatPosition == true) Say "Number index";

6) Say the item[index] followed by some silence;

7) If (index < listSize) Say "Number index + 1";

8) If (caller barged in)
   a.   If the caller said a valid number (like number three), exit;
   b.   If the caller said 'Yes', exit   // item number index;
   c.   update command;
   Otherwise set command = 'Silence';

METHOD AND APPARATUS FOR ROBUSTLY LOCATING USER BARGE-INS IN VOICE-ACTIVATED COMMAND SYSTEMS

BACKGROUND OF THE INVENTION

The present invention generally pertains to voice-activated command systems and speech recognition applications. More specifically, the present invention pertains to methods and apparatus for determining a position of a user barge-in in response to a query list from the speech recognition application.

It is very common in speech applications to ask users to go through some lists of items. For example, in a voice-dialer or name-dialer application, the voice-dialing system typically uses an introductory message to greet a caller, and to inquire from the caller who they would like to contact. The caller then speaks the name of the person he or she wishes to contact, and the voice-dialing system uses a speech recognition technique to identify or recognize the names of one or more potential call recipients which hopefully include the caller's intended call recipient. In some voice dialing systems, the voice dialing application then typically asks the caller to pick the correct name from the speech recognition engine's suggested N-best alternatives, or to select the correct recipient in the case of name collisions (names with identical spellings or names which are homonyms). A usability study strongly shows that most callers prefer to barge-in a "Yes" after they hear the correct item.

One problem experienced by speech applications which rely on user barge-ins to select one of a list of choices is that it is difficult to determine the location of the user barge-in in many instances. For instance, consider the following example exchange between a voice-command system and a user:

System: Please select one from the following five people.
    System: Number one, Jeffrey Olson
    System: Number two, Jeffrey Ollason
    System: . . .
    User: Yes (Barged-in)

In this example, the user might think he/she barged-in on the second item. However, at that time the system had started the third prompt (even though the caller hadn't heard the phrase "Number three" yet) As a result, the intention of the caller may have been misrecognized.

The capability of robustly determining the location of barge-ins can help provide efficient and user-friendly voice user interfaces in such scenario. However, most speech platforms either cannot provide a robust and accurate prompt bookmark, or do not provide this bookmark feature at all.

The present invention provides solutions to one or more of the above-described problems and/or provides other advantages over the prior art.

SUMMARY OF THE INVENTION

A method of querying a user to select from a list in a voice-activated command system is provided. The method includes generating command prompt phrases during which the user can select items on the list. The command prompt phrases include an item on the list and an index for another item on the list. In some embodiments, each command prompt phrase also includes a period of silence between the item on the list and the index for another item on the list. If a user selecting barge-in is received during a particular command prompt phrase, the corresponding item on the list is selected.

Other features and benefits that characterize embodiments of the present invention will be apparent upon reading the following detailed description and review of the associated drawings.

BRIEF DESCRIPTION OF THE DRAWINGS

FIG. 3 is an illustration of an algorithm for navigating through a prompt list in accordance with example embodiments of the present invention.

DETAILED DESCRIPTION OF ILLUSTRATIVE EMBODIMENTS

I. Exemplary Environments

Various aspects of the present invention pertain to methods and apparatus for determining a position of a user barge-in in response to a prompt subject list (or query list) from a voice command system. Examples of well-known computing systems, environments, and/or configurations that may be suitable for use with the invention include, but are not limited to, personal computers, server computers, hand-held or laptop devices, multiprocessor systems, microprocessor-based systems, set top boxes, and voice-activated command systems such as programmable dialing applications. Embodiments of the present invention can be implemented in association with a call routing system, wherein a caller identifies with whom they would like to communicate and the call is routed accordingly. Embodiments can also be implemented in association with a voice message system, wherein a caller identifies for whom a message is to be left and the call or message is sorted and routed accordingly. Embodiments can also be implemented in association with a combination of call routing and voice message systems. It should also be noted that the present invention is not limited to call routing and voice message systems. These are simply examples of systems within which embodiments of the present invention can be implemented. In other embodiments, the present invention is implemented in a voice-activated command system in which a user is asked to provide a verbal barge-in to select an item, task or choice from a list.

Prior to discussing embodiments of the present invention in detail, exemplary computing environments within which the embodiments and their associated systems can be implemented will be discussed.

Figure 1:
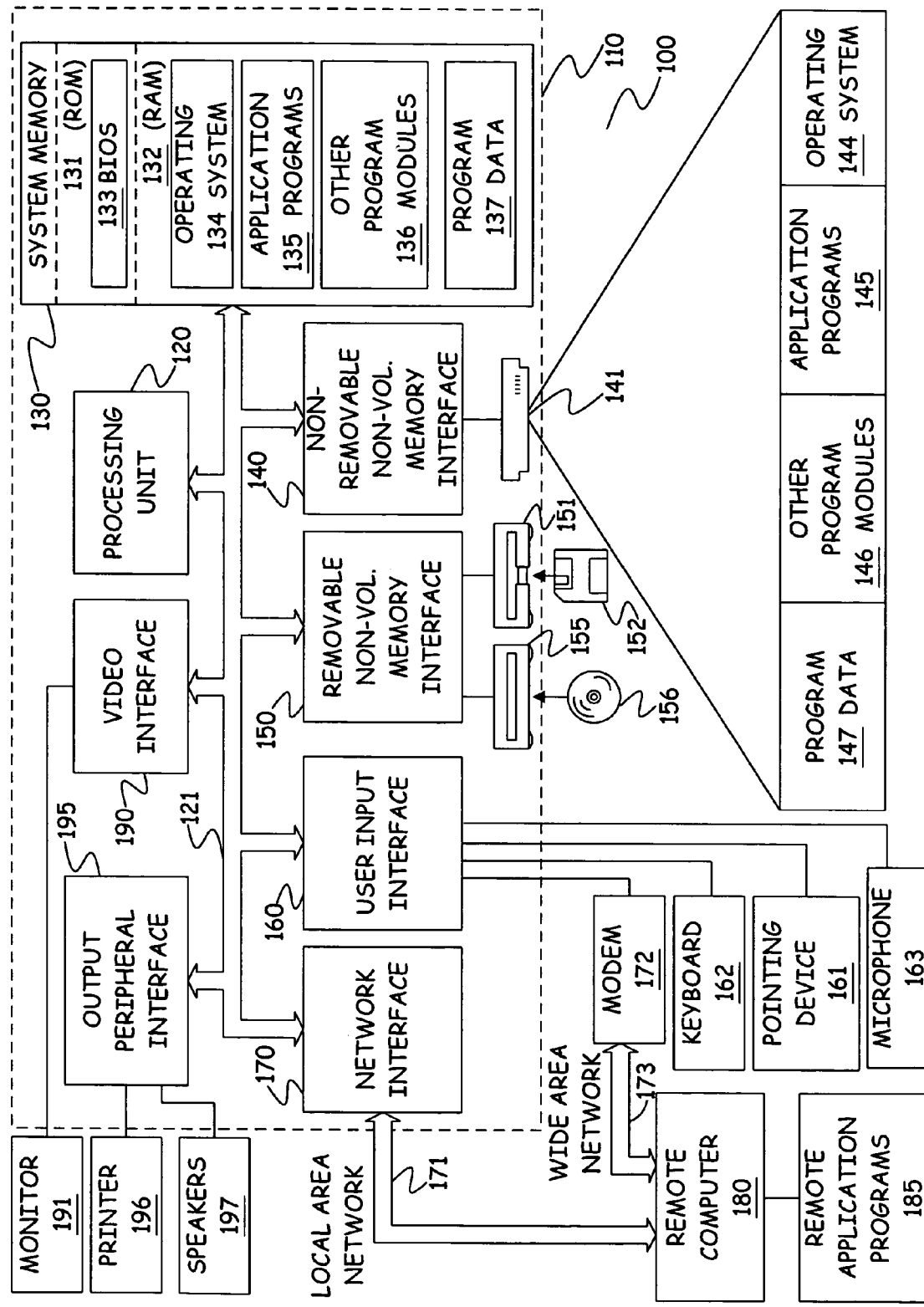
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Voice-Command System

As noted above, the present invention can be implemented, for example, in voice-command systems (or voice-activated command systems) which audibly provide a list of items or choices for a user to select from. When the user makes a verbal utterance to select one of the items or choices, this is considered a "barge-in." As will be described below in greater detail, the present invention breaks the selection list into individual phrases to robustly locate the position of user barge-ins. With the invention, barge-ins positions can more robustly be determined, with or without bookmark support from the speech recognition engine. While the present invention can be embodied in a wide variety of voice-activated command systems, it is not limited to use with voice-activated command systems. Instead, the present invention applies more generally to command systems where a user is verbally prompted to select from a list of possible options. The selection by the user of an item or option from the list need not be accomplished using voice activation, but rather can be accomplished using any desired type of input from the user, including for example inputs from input devices such as pointer devices (such as a mouse), computer keyboards, telephone keypads, etc. Thus, these types of inputs can be considered "barge-ins" within the context of a command system where the option being selected by the user must be determined by the system based upon the timing of the barge-in. In one exemplary embodiment described below, the present invention is described with reference to a voice-activated command system. However, the illustration of this exemplary embodiment of the invention does not limit the scope of the invention to voice-activated command systems.

A. System Overview

Figure 2:
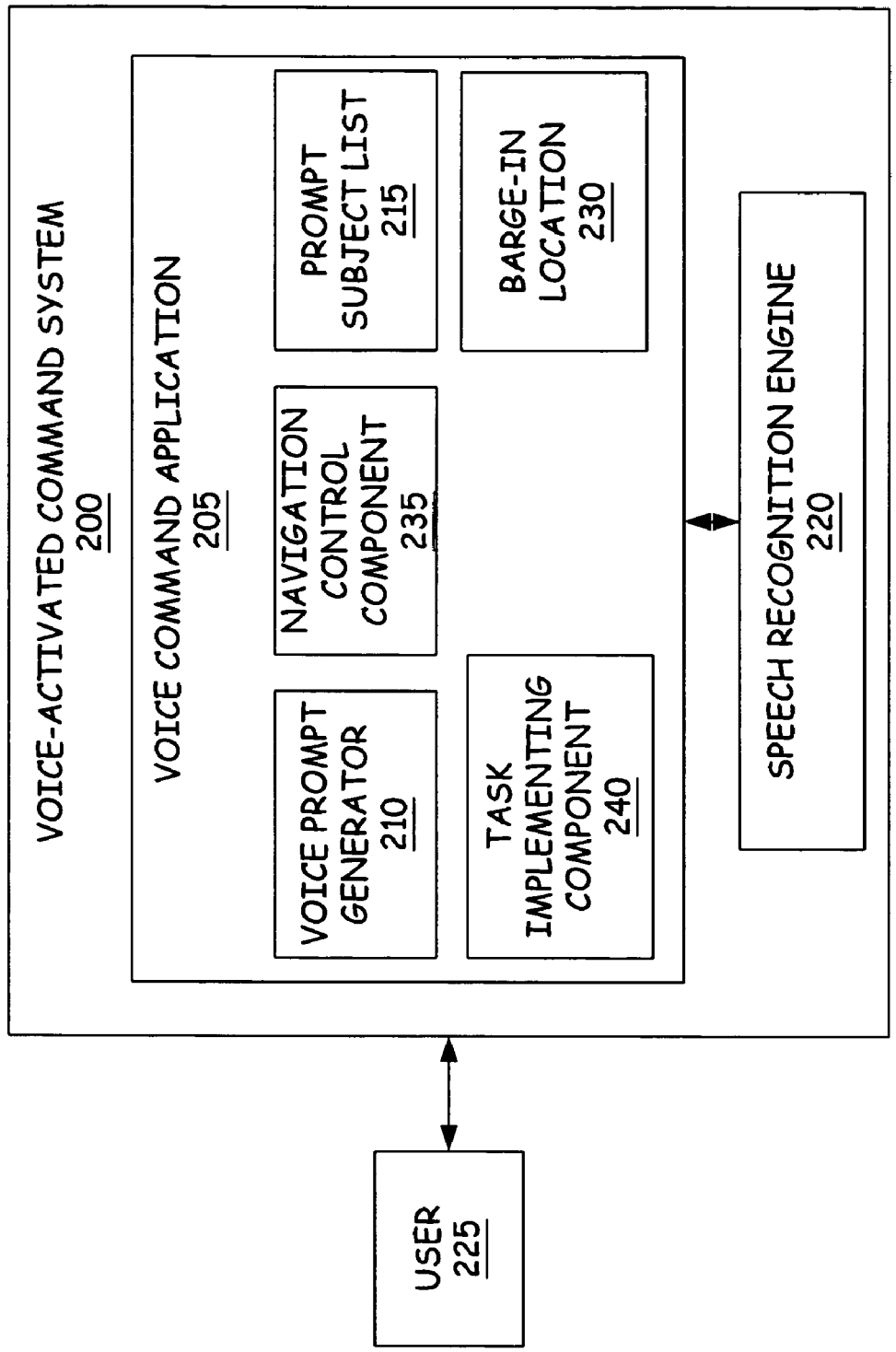
FIG. 2 is a schematic block diagram representation of a voice-activated command system.

FIG. 2 is a schematic block diagram of a voice-activated command system 200 in accordance with an example embodiment of the present invention. System 200 is accessible by a user 225 to implement a task. System 200 includes a voice command application 205 having access to a list or database 215 of choices to be presented to the user for selection. For example, the list of choices can include a list of names of potential call recipients in a voice-dialer application; a list of potential tasks in an automated system such as an automated banking system; a list of items for potential purchase in an automated sales system; a list of items, places or times for potential reservation in an automated reservation system; etc. Many other types of lists of choices can be presented as well.

As in conventional voice-activated command systems, in system 200 the voice command application 205 includes a voice prompt generator 210 configured to generate voice prompts which ask the user to select one of the choices in the list 215. The voice prompts can be generated, for example, using voice talent recordings or text-to-speech (TTS) generation. Voice prompt generator 210 uses aspects of the present invention to generate voice prompt phrases in a manner which facilitates robust barge-in position determination. These aspects are described below in greater detail.

System 200 also includes speech recognition engine 220 which is configured to recognize verbal or audible inputs from the user 225 during or in response to the generation of voice prompts by voice prompt generator 210. A barge-in locating component or module 230 then identifies a probable intended selection by the user of an item on the list 215. Barge-in locating component 230 uses the timing of the barge-in, relative to the timing of the generation of the voice prompts, to make this identification.

The present invention includes a method of breaking up the presentation of the list into smaller prompt sections or individual phrases in a manner which allows the user's intent of barge-in to be more robustly determined by barge-in location component 230. By breaking the selection list into these individual phrases, one for each item on the list, the problem of determining the location of a barge-in is converted to a much simpler problem of identifying whether a barge-in occurs within individual phrases.

In exemplary embodiments of the present invention, voice command application 205 also includes a navigation control module or component 235 which controls navigation through the list in response to navigation commands. As will be described below in greater detail, navigation control component 235 adjusts prompt phrases, when the system is instructed by the user to repeat or skip a prompt phrase, to include a correct index number associated with the item in the prompt phrase.

In exemplary embodiments, voice command application 205 also includes task implementing module or component 240 configured to carry out the task associated with the user's chosen list item or option. For example, component 240 can embody the function of connecting a caller to an intended call recipient in a voice dialer application implementation of system 200. In other implementations of system 200, component 240 carries out tasks which correspond to the particular type of system.

B. Breaking Long Lists Into Individual Phrases

In order to accurately determine which name (or other item) in a list is being selected with a user barge-in, it is necessary to correlate the timing of the user barge-in to a particular name on the list. Even with bookmark support to provide such time correlation, this is a problematic task which can be prone to errors resulting in misrecognizing the user intentions. The present invention is based in part upon the realization that breaking the prompt list into individual phrases can significantly improve the ability to correlate the barge-in time or location to a particular name or item on a list. Further aspects of this concept are illustrated below.

A long list can be broken up into individual phrases to facilitate the barge-in location detection process. However, due to the fact that latency exists in every part of the system, the race condition presents a big threat to the practical value of the whole approach as is illustrated in the following example in which a list and related prompts are separated into separate phrases:

EXAMPLE 1

System: "Please select one from the following five people."
System: "Number one, Jeffrey Olson"
System: "Number two, Jeffrey Ollason"
System: . . .
User: "Yes" (Barged-in)

The user might think he/she barged-in on the second item (Jeffrey Ollason) in response to the second phrase "Number two, Jeffrey Ollason". However, at that time the system has started the third prompt (even though the caller hasn't heard the "Number three" portion of the third phrase yet). As a result, the intention of the caller was misrecognized.

In accordance with embodiments of the present invention, the sensibility of the race condition is greatly reduced by breaking the list into phrases at slightly different locations to provide longer windows for the caller to make up his/her mind. For example, consider the following set of phrases to present the same list as was presented in the first example:

EXAMPLE 2

System: "Please select one from the following five people. Number one"
System: "Jeffrey Olson, <some silence> Number two"
System: "Jeffrey Ollason, <some silence> Number . . . "
User: "Yes" (Barged-in)

The correct handling of the critical timing around the window "<some silence> Number . . . " in the second phrase or prompt (following the introductory phrase or prompt) completely eliminates the race condition in a usability study. In other words, for a particular item in a list (for example Jeffrey Ollason), by setting a barge-in response window for this item to include both the time it takes to say this item and the time it takes to say an item index number or designation for the next item in the list, the occurrence of misrecognization is greatly reduced. The item index number or designation for the first item in the list can be included in the introductory phrase or prompt (i.e., "Please select one from the following five people. Number one").

C. Navigation and Prompt Adjustment

To support navigation through the list, the present invention includes in some embodiments navigation commands like "Next", "Previous", "Repeat", and "Start Over" which the caller or user can use to navigate through the list. In one embodiment, the word "No" is treated the same as the "Next" command. Also, in some embodiments, the silence timeout (a very short value) is treated as if the caller has issued a "Next" command. These navigation commands are recognized by speech recognition engine 220, and in response navigation control component 235 navigates through the list 215, causing voice prompt generator 210 to adjust the prompt phrases accordingly. In exemplary embodiments of the present invention, the command prompt phrases are adjusted to add the correct item or index number in the front of the prompt when the caller issues any of the navigation commands. Consider this third example:

EXAMPLE 3

System: "Please select one from the following 5 people. Number one"
System: "Jeffrey Olson, <some silence> Number two"
User: "Repeat"
System: "Number One, Jeffrey Olson, <some silence> Number two"

As can be seen in this example, index "Number One" of the previous command prompt phrase is added to the current command prompt phrase "Jeffrey Olson, <some silence> Number two" to aid in providing an easily understandable navigation prompt process.

D. Example Algorithm

The above-described methods and aspects of the present invention can be implemented in a wide variety of voice-command systems using a variety of different algorithms. For illustrative purposes, one such algorithm is illustrated in FIG. 3. In FIG. 3, a navigation algorithm is shown, including steps 0) through 9). This algorithm is described with reference to Example 4 as follows.

EXAMPLE 4

Suppose there are three names in the list: 'Jeffrey Olson', 'Jeffrey Ollason', and 'David Ollason', So listSize=3. Three scenarios are provided for this example.

Scenario #1: The correct name is not in the list, falls out from the list.
System: "Please select one from the following three people. Number one"
System: "Jeffrey Olson <some silence> Number two"
System: "Jeffrey Ollason <some silence> Number three"
System: "David Ollason <some silence>"

Given scenario #1, the algorithm described above will be executed as follows:

In step 0): the system renders the introduction prompt: "Please select one from the following three people. Number one", command is set to 'Silence' and index=0.

Nothing happens in steps 1) and 2).

In step 3): bRepeatPosition=false because command is 'Silence'.

In step 4) index is bumped up to 1 since command is 'Silence'.

Nothing happens in step 5) because bRepeatPosition=false.

In step 6) the system renders 'Jeffrey Olson' followed by some silence.

In step 7) the system adds 'Number two' because index (1)<listSize (3).

Suppose the caller remains silent in step 8) so command remains to 'Silence'.

In step 9) the system goes back to step 1), and again nothing happens in steps 1) and 2) (index is 1).

In step 3) bRepeatPosition=false because command is 'Silence'.

In step 4) index is bumped up to 2 since command is 'Silence'.

Nothing happens in step 5) because bRepeatPosition=false.

In step 6) The system renders 'Jeffrey Ollason' followed by some silence.

In step 7) 'Number three' is added because index (2)<listSize (3).

Suppose the caller remains silent in step 8) so command remains to 'Silence'.

In step 9) the system goes back to step 1).
Again nothing happens in steps 1) and 2) (index is 2).
In step 3) bRepeatPosition=false because command is 'Silence'.
In step 4) index is bumped up to 3 since command is 'Silence'.
Nothing happens in step 5) because bRepeatPosition=false.
In step 6) the system renders 'David Ollason' followed by some silence.
Nothing happens in step 7) because index (3)=listSize (3).
Suppose the caller remains silent in step 8) so command remains to 'Silence'.
In step 9) the system goes back to step 1).
Nothing happens in step 1) but the system exits from the loop in step 2) because index=listSize=3.

Scenario #2: The caller or user navigates the list with navigation commands 'Repeat' and 'Yes'.
System: "Please select one from the following three people. Number one"
System: "Jeffrey Olson <some silence> Number . . . "
User: "Repeat"
System: "Number one Jeffrey Olson <some silence> . . . "
User: "Yes".

Given scenario #2, the algorithm described above will be executed as follows:
In step 0): the system renders the introduction prompt: "Please select one from the following three people. Number one", command is set to 'Silence' and index=0.
Nothing happens in steps 1) and 2).
In step 3) bRepeatPosition=false because command is 'Silence'.
In step 4) index is bumped up to 1 since command is 'Silence'.
Nothing happens in step 5) because bRepeatPosition=false
In step 6) the system renders 'Jeffrey Olson' followed by some silence.
In step 7) the system adds 'Number two' because index (1)<listSize (3).
The caller barged in with a 'Repeat' so the command was updated to 'Repeat' in step 8).
In step 9) the system goes back to step 1). Again nothing happens in steps 1) and 2) (index is 1).
In step 3) bRepeatPosition=true because command is 'Repeat'.
In step 4) index stays at 1 since command is 'Repeat'.
In step 5) the system repeats 'Number 1' because bRepeatPosition=true this time.
In step 6) the system renders 'Jeffrey Olson' followed by some silence.
In step 7) the system adds 'Number two' because index (1)<listSize (3).
The caller barged in with a 'Yes' so the system exits the loop in step 8) with the correct index 1.

Scenario #3: An impatient caller navigates the list with 'Next', 'Start Over' and the index directly.
System: "Please select one from the following 3 people. Number one"
System: "Jeffrey Olson . . . "
User: "Next"
System: "Number two Jeffrey Ollason <some silence> . . . "
User: "Start Over"
System: "Number one Jeffrey Olson <some silence> . . . "
User: "Number two"

Given scenario #3, the algorithm described above will be executed as follows:
In step 0): The system renders the introduction prompt: "Please select one from the following three people. Number one", command is set to 'Silence' and index=0.
Nothing happens in steps 1) and 2).
In step 3) bRepeatPosition=false because command is 'Silence'.
In step 4) index is bumped up to 1 since command is 'Silence'.
Nothing happens in step 5) because bRepeatPosition=false.
In step 6) the system renders 'Jeffrey Olson' followed by some silence.
In step 7) the system adds 'Number two' because index (1)<listSize (3).
The caller barged in with a 'Next' so the command was update to 'Next' in step 8).
In step 9) the system goes back to step 1).
Again nothing happens in steps 1) and 2) (index is 1).
In step 3) bRepeatPosition=true because command is 'Next'.
In step 4) index is bumped up to 2 since command is 'Next'.
In step 5) the system renders 'Number 2' because bRepeatPosition=true.
In step 6) the system renders 'Jeffrey Ollason' followed by some silence.
In step 7) the system adds 'Number three' because index (2)<listSize (3), but the user didn't hear it.
The user barged in with a 'Start Over' so the command was updated to 'Start Over' in step 8)
In step 9) the system goes back to step 1).
In step 1) the index is reset to 1 because command is 'Start Over'.
Nothing happened and step 2) (index is 1).
In step 3) bRepeatPosition=true because command is 'Start Over'.
In step 4) index stays at 1 since command is 'Start Over'.
In step 5) the system renders 'Number 1' because bRepeatPosition=true this time.
In step 6) the system renders 'Jeffrey Olson' followed by some silence.
In step 7) the system adds 'Number two' because index (1)<listSize (3).
The caller barged in with a 'Number two', so the system exits the loop in step 8) with the correct index 2.

Figure 4:
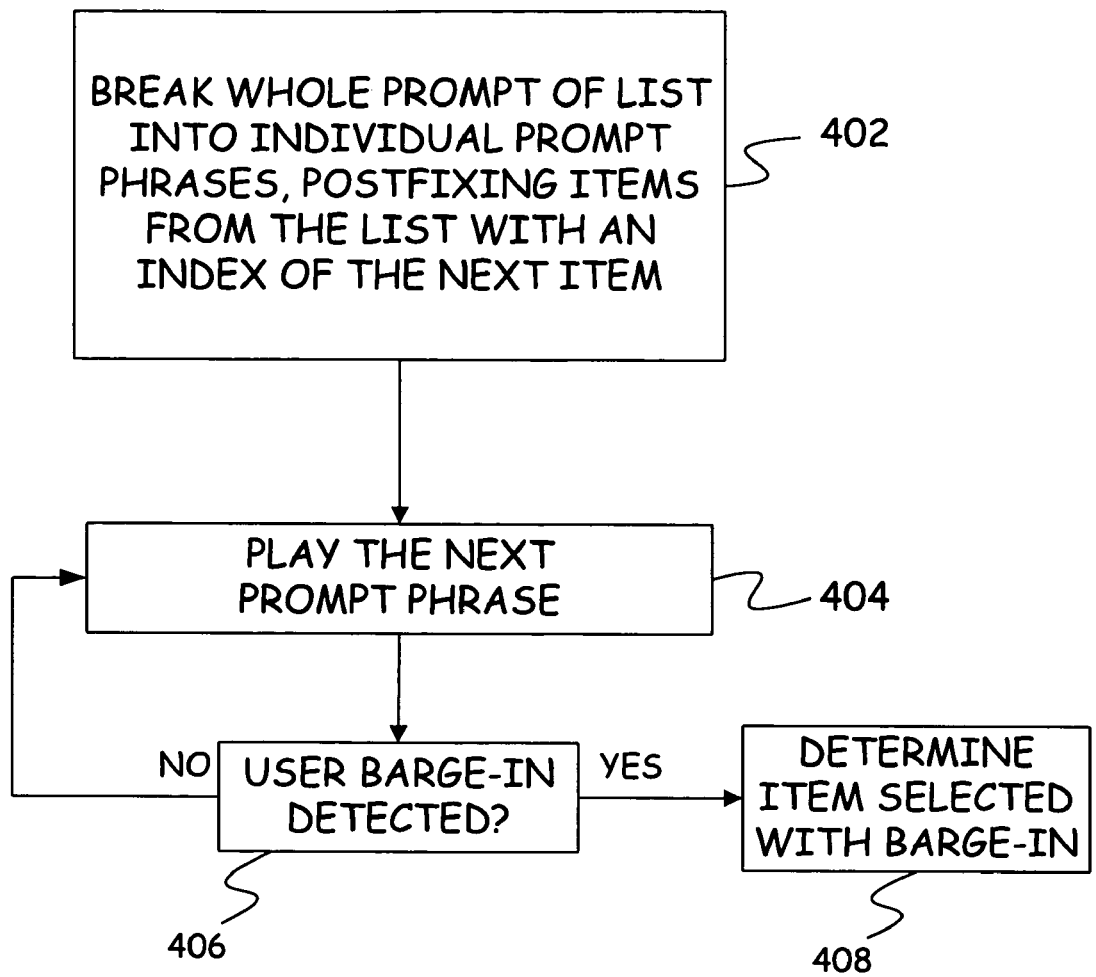
FIG. 4 is a block diagram illustrating a method in accordance with embodiments of the present invention.

FIG. 4 is a block diagram illustrating a general method in accordance with some embodiments of the present invention. The method is based upon a first aspect of the command prompt phrases described above. As shown in FIG. 4, the method includes the step 402 of breaking the whole prompt of the list into individual prompt phrases. The individual prompt phrases include the new boundary aspects described above in which individual prompt phrase include an item or choice from the list and an index. In accordance with aspects of the present invention, within a prompt phrase containing an item, instead of the index of that item prefixing the item, the index of the next item (from the next prompt phrase) postfixes the item. At 404, the method is shown to include the step of playing the next prompt phrase. If at step 406 it is determined that no user barge-in has been detected, then step 404 is repeated for the next prompt phrase. If at step 406 it is determined that a user barge-in has been detected, then at step 408 the item selected with the barge-in is determined, and the corresponding task is implemented. The method can also be extended to include the generation of an introductory phrase which contains the index for the first item on the list. The method can also be extended as described previously to the adjustment or regeneration of command prompt phrases, in response to receipt of a navigation command, to begin with the index for the particular item included in that command prompt phrase.

Although the present invention has been described with reference to particular embodiments, workers skilled in the art will recognize that changes may be made in form and detail without departing from the spirit and scope of the invention.

What is claimed is:

1. A computer-implemented method of querying a user to select from a list in a voice-activated command system, the method comprising:

generating, and presenting to the user, a first command prompt phrase, the first command prompt phrase being a voice prompt phrase that includes a first item on the list and an index for a second item on the list, the first command prompt phrase not including an index for the first item on the list, wherein the index for the first item on the list is instead included in a different command prompt phrase for a different item that immediately precedes the first item on the list, and wherein the second item on the list immediately follows the first item on the list;

selecting the different item from the list if a user selection barge-in is received during a presentation, to the user, of the index for the first item on the list as part of a presentation, to the user, of the different command prompt phrase;

receiving a verbal navigation command from the user;

utilizing a computer processor that is a component of the computer to adjust the first command prompt phrase, in response to the verbal navigation command received from the user, such that the adjusted first command prompt phrase does not include the different item or the second item on the list but does include the index for the first item on the list, the first item on the list, and the index for the second item on the list;

generating, and presenting to the user, as a further response to the verbal navigation command received from the user, the adjusted first command prompt phrase, the adjusted first command prompt phrase being a voice prompt phrase that includes the index for the first item on the list, the first item on the list, and the index for the second item on the list; and selecting the first item on the list if the user selection barge-in is received during a presentation, to the user, of the index for the first item on the list as part of said presentation, to the user, of the adjusted first command prompt phase.

2. The method of claim 1, wherein the step of generating the first command prompt phrase further comprises including in the first command prompt phrase a period of silence between the first item on the list and the index for the second item on the list.

3. The method of claim 1, wherein the verbal navigation command is received during the first command prompt phrase and is an instruction to repeat the first command prompt phrase.

4. The method of claim 1, wherein the index for the first item on the list, which is included within the different command prompt phrase and the adjusted first command prompt phrase, is an identifier that is indicative of a value within an indexing scheme for uniquely identifying items included in the list.

5. The method of claim 1, wherein the different command prompt phrase is an introduction command prompt phrase.

6. The method of claim 1, wherein the index for the first item on the list includes a first value and the index for the second item on the list includes a second value, the first and second values being consecutive to one another within an identification scheme.

7. The method of claim 1, wherein the verbal navigation command is an instruction to repeat the first command prompt phrase.

8. The method of claim 1, wherein the adjusted first command prompt phrase includes a re-presentation of the first item on the list in response to the verbal navigation command.

9. A computer-implemented method of querying a user to select from a list in a voice-activated command system, the method comprising:

breaking a prompt of the list into a plurality of individual prompt phrases, with individual prompt phrases including an item from the list, wherein individual prompt phrases also include as a postfix to the item an index of a next item included in a next individual prompt phrase;

playing a next of the plurality of individual prompt phrases;

determining whether a user barge-in has been detected;

if it is determined that a user barge-in has been detected, then determining the corresponding item from the list; and if it is determined that a user barge-in has not been detected, then repeating the steps of playing and determining for additional individual prompt phrases;

receiving a verbal navigation command from the user;

utilizing a computer processor that is a component of the computer to re-define one of the individual prompt phrases for a particular item from the list, in response to the verbal navigation command received from the user, such that the re-defined individual prompt phrase includes the index for the particular item from the list as a prefix to the particular item and also includes, as a postfix to the particular item, the index for an item that immediately follows the particular item on the list, wherein re-defining the individual prompt phrases for a particular item from the list further comprises increasing the number of words during which a selection barge-in will cause a corresponding selection of the particular item from the list, and wherein the increase is contingent upon receipt of the verbal navigation command from the user such that the increase is not made if the verbal navigation command is not received; and playing the redefined individual prompt phrase.

10. The method of claim 9, wherein breaking the prompt of the list into the plurality of individual prompt phrases further comprises generating the individual prompt phrases such that they include a period of silence between the corresponding item from the list and the index of the next item on the list.

11. The method of claim 10, and further comprising generating an introduction prompt phrase, the introduction command prompt phrase including an introductory statement and an index for a first item on the list.

12. The method of claim 9, wherein the verbal navigation command received from the user is a command to repeat said particular item from the list.

13. The method of claim 9, wherein the index for the particular item on the list includes a first value and the index for the item that immediately follows the particular item on the list includes a second value, the first and second values being consecutive to one another within an identification scheme.

14. A computer-implemented voice command system comprising:
- a voice prompt generator that generates a first prompt phrase, the first prompt phrase including a first item on a list and an index for a second item on the list as a postfix to the first item on the list;
- an input that receives a user barge-in, the input comprising a speech recognition engine that receives audible user barge-ins and verbal navigation commands;
- a barge-in locating component that selects the first item on the list if the user barge-in is received during the first prompt phrase which includes the first item on the list and the index for the second item on the list;
- the voice prompt generator also generating a second prompt phrase, the second prompt phrase including the second item on the list and an index for a third item on the list; and
- a computer processor that is a component of the computer, the computer processor being implemented by a navigation control component to control the voice prompt generator, in response to receipt of a verbal navigation command from the user, to generate and present to the user an adjusted first command prompt phrase through adjustment of the first prompt phrase, wherein the adjusted first command prompt phrase includes the index for the first item on the list, the first item on the list, and the index for the second item on the list.

15. The system of claim 14, wherein the adjusted first command prompt phrase is a command to repeat the first item on the list.

16. The system of claim 15, wherein:
- the first command prompt phrase includes a first number of words during which a selection barge-in command received from the user will cause a selection of the first item on the list;
- the second command prompt phrase includes a second number of words during which a selection barge-in command received from the user will cause a selection of the first item on the list; and
- the first number of words is a fewer number of words than the second number of words.

17. The system of claim 16, wherein the presentation of the adjusted first command prompt phrase to the user occurs in direct response to receipt of said command to repeat the first item on the list.

18. The system of claim 17, wherein the system presentation of the adjusted first command prompt phrase to the user is contingent upon receipt of said command to repeat the first item on the list.

* * * * *